(12) United States Patent
Katz

(10) Patent No.: US 11,515,829 B1
(45) Date of Patent: Nov. 29, 2022

(54) FLASHING AND L-BRACKET ASSEMBLY FOR RACK MOUNTING OF SOLAR PANELS ON ROOF

(71) Applicant: David Katz, Arcata, CA (US)

(72) Inventor: David Katz, Arcata, CA (US)

( * ) Notice: Subject to any disclaimer, the term of this patent is extended or adjusted under 35 U.S.C. 154(b) by 579 days.

(21) Appl. No.: 16/699,575

(22) Filed: Nov. 30, 2019

(51) Int. Cl.
*E04B 1/38* (2006.01)
*H02S 20/23* (2014.01)

(52) U.S. Cl.
CPC ............. *H02S 20/23* (2014.12); *E04B 1/38* (2013.01); *E04B 2001/405* (2013.01)

(58) Field of Classification Search
CPC ........ E04B 1/38; E04B 2001/405; E04B 1/64; H02S 20/23; E04D 13/14; E04D 13/1478
See application file for complete search history.

(56) References Cited

U.S. PATENT DOCUMENTS

| | | | |
|---|---|---|---|
| 7,856,769 B2 | 12/2010 | Plaisted et al. | |
| 7,921,607 B2 * | 4/2011 | Thompson | F24S 25/61 52/27 |
| 8,122,648 B1 * | 2/2012 | Liu | F24S 25/61 52/173.3 |
| 8,276,330 B2 | 10/2012 | Harberts | |
| 8,713,858 B1 * | 5/2014 | Xie | F24S 25/613 52/60 |
| 8,869,470 B2 * | 10/2014 | Lanza | H02S 20/23 52/173.3 |
| 9,027,248 B2 | 5/2015 | Flaherty et al. | |
| 9,166,526 B2 | 10/2015 | Durney et al. | |
| 10,676,934 B2 * | 6/2020 | Fischer | E04D 13/14 |
| 2010/0236155 A1 * | 9/2010 | Lanza | F24S 25/613 52/173.3 |
| 2015/0361668 A1 * | 12/2015 | Stearns | E04D 13/00 52/698 |
| 2018/0167020 A1 * | 6/2018 | Truthseeker | H02S 30/00 |
| 2018/0274238 A1 * | 9/2018 | Aliabadi | E04D 13/00 |
| 2019/0081587 A1 * | 3/2019 | Mayfield | F24S 25/636 |
| 2019/0115866 A1 * | 4/2019 | Mayfield | E04B 1/66 |

* cited by examiner

*Primary Examiner* — Beth A Stephan
(74) *Attorney, Agent, or Firm* — Robert Brownstein

(57) ABSTRACT

The invention herein disclosed and claimed is an L-bracket and flashing assembly used to mount a rack for supporting a solar-panel array. It uses fewer sub-assemblies and is simpler and faster to install than prior art L-bracket and flashing assemblies.

2 Claims, 4 Drawing Sheets

FLASHING AND L-BRACKET ASSEMBLY FOR RACK MOUNTING OF SOLAR PANELS ON ROOF

TECHNICAL FIELD

This invention is a mechanical assembly used to mount solar-panel racks on a roof.

BACKGROUND OF THE INVENTION

Solar panels for converting sunlight to electricity are becoming increasingly popular as prices of components continue to decrease and component quality and reliability continues to increase. Most solar-panel installations are done on the roof of a house or commercial building. The rack that holds the solar panels is typically mounted such that its plane is parallel to that of the roof and the rack is positioned typically several inches above the roof's surface.

A rack mounting technique commonly makes use of L-brackets and flashing assemblies. The flashing assemblies are essentially flat, rectangular, metallic sheets. Sitting atop the flashing sub-assembly is an L-bracket. A hole in the flashing and L-bracket are aligned and a lag bolt is typically inserted through a rubberized sub-assembly which sits atop the L-bracket, which in turn sits atop the flashing sub-assembly. When the lag bolt is screwed into the roof surface, it is tightened so as to partially compress the rubberized sub-assembly so as to form an essentially water-tight seal.

Over time, the rubberized sub-assembly may degrade due to sunlight and heat possibly compromising the water-tight seal and allowing water to penetrate through the roof surface into the interior.

BRIEF SUMMARY OF THE INVENTION

The invention herein disclosed and claimed is a flashing and L-bracket assembly that reduces the possibility of water-tight seal degradation.

The flashing sub-assembly, like prior art, is mostly a flat metallic sheet. However the flashing sub-assembly has an upraised portion that is dimensioned so as to allow the portion of the L-bracket assembly that is parallel to a roof surface to sit underneath the flashing. The lag bolt then passes directly through both the flashing and L-bracket requiring no rubberized sub-assembly. Because the upraised portion of the flashing sub-assembly is higher than the surrounding sheet material, it creates a flow path away from the lag bolt and onto the lower portion of the flashing assembly. Optionally, a small O-ring can be inserted in a groove around the periphery of the aperture in the flashing through which a lag bolt is inserted in the upraised flashing sub-assembly as to further prevent leakage and insure a water-tight seal.

BRIEF DESCRIPTIONS OF THE DRAWINGS

DETAILED DESCRIPTION OF THE INVENTION

The invention herein disclosed and claimed is a flashing and L-bracket assembly used for mounting a solar-panel rack on an external roof surface or other mounting surface. It may also be used to mount racks that support other kinds of loads in addition to solar-panels.

Prior art mounting assemblies include L-brackets and flashing, however, the flashing is essentially a flat metallic sheet wherein the L-bracket is mounted above it and a lag bolt used to affix the assembly to a roof passes through a rubberized sub-assembly above the L-bracket which is partially compressed due to tightening of the lag bolt. Over time the rubberized sub-assembly may become degraded due to sunlight and heat compromising its initial water-tight seal function.

The invention herein disclosed uses an L-bracket as in the prior art however the flashing sub-assembly has a structure wherein the L-bracket can be inserted below the flashing sub-assembly because the flashing subassembly has a raised portion dimensioned such that one portion of the L-bracket can be slipped below it. The flashing sub-assembly remains flush with the exterior roof surface except for the raised portion. When a portion of the L-bracket is inserted beneath the flashing sub-assembly, the L-bracket and flashing sub-assembly are essentially flush with the exterior roof surface.

The raised portion of the flashing sub-assembly slopes in all directions toward the remaining flat portion of the flashing sub-assembly. Hence, any water that lands on the raised portion will flow away from the lag bolt thereby increasing the water-tight characteristic and avoiding leakage of water through the lag bolt and into the interior below the roof surface. The aperture in the raised portion of the flashing sub-assembly may allow insertion of an O-ring that enhances the water-tight characteristic.

Figure 1:
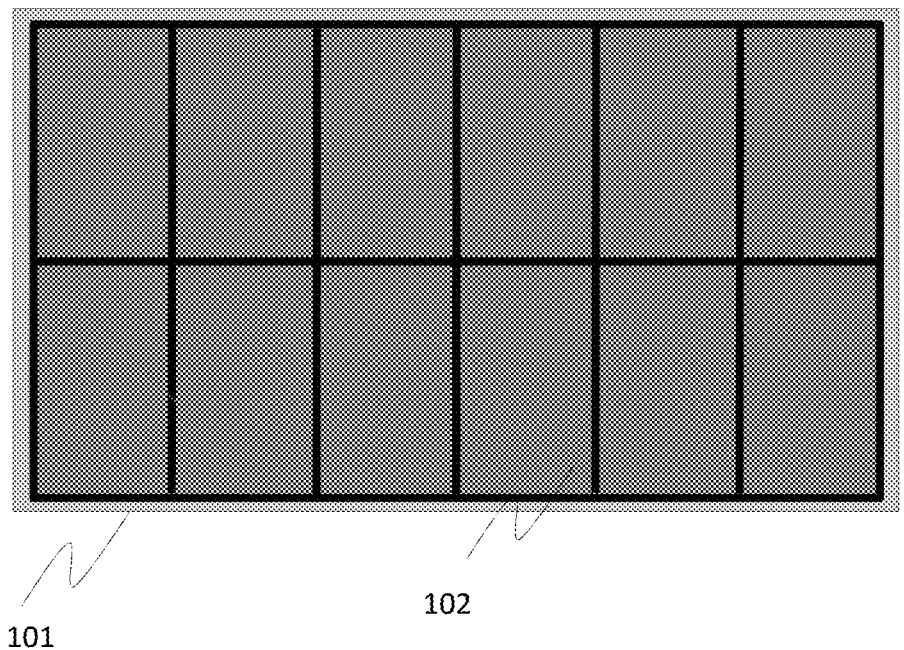
FIG. 1 depicts a top view of a roof-mounted rack and solar panels.

As shown in FIG. 1, a typical solar-panel roof installation comprises an array of solar panels (102) and a supporting frame (101).

Figure 2:
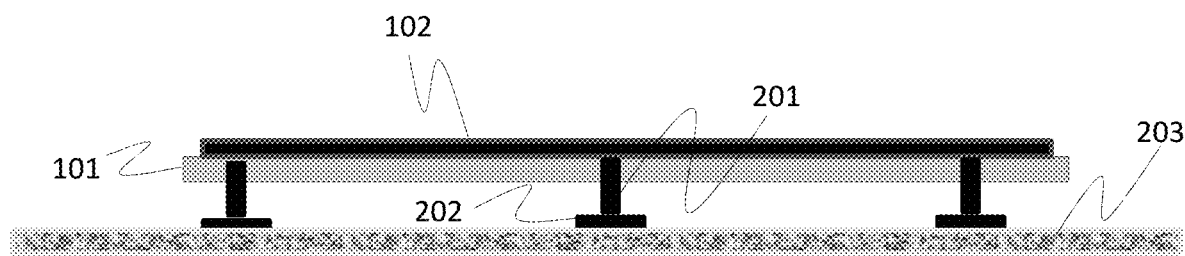
FIG. 2 depicts a side view of a roof-mounted rack and solar panels from FIG. 1.

FIG. 2 shows the structure of FIG. 1 from a side view showing the juxtapositions of solar panels (102), frame (101), L-bracket (201), flashing (202) and roof surface (203).

Figure 3:
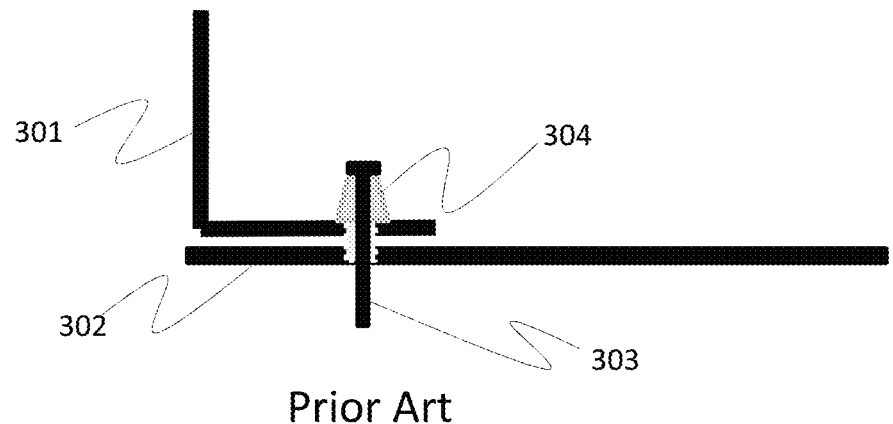
FIG. 3 depicts shows a prior-art assembly used for solar-panel rack mounting.

Exemplary prior art is illustrated in FIG. 3 wherein L-bracket (301) and flashing (302) are placed such that flashing is flush with the roof surface, the L-bracket sits atop the flashing, their respective apertures are aligned, and lag bolt (303) first passes through rubberized sub-assembly (304) and then through the L-bracket and flashing apertures into the exterior roof surface.

Figure 4:
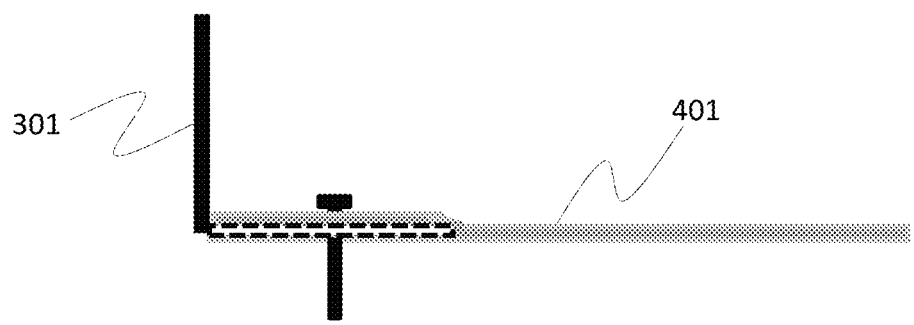
FIG. 4 depicts an implementation of the invention.

FIG. 4 illustrates one embodiment of the invention in which L-bracket (301) is now inserted below flashing (401) wherein a raised portion of the flashing permits the L-bracket to be inserted below the flashing such that the combination of flashing and L-bracket present a flat surface atop the exterior roof surface (not shown).

Figure 5:
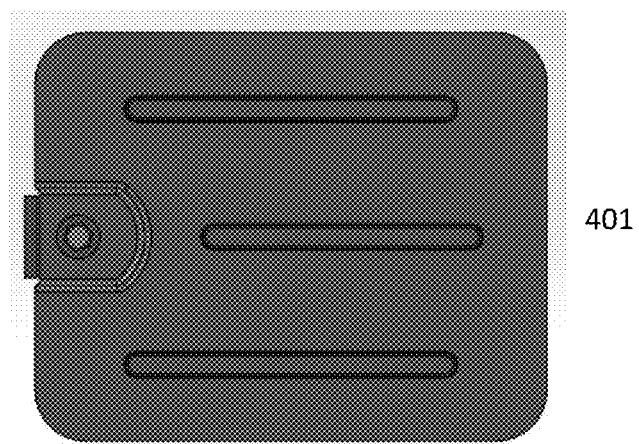
FIG. 5 shows an implementation of the flashing sub-assembly

FIG. 5 shows a top view of the flashing sub-assembly 401. Note that the raised portion extends to an edge of the flashing sub-assembly such that a portion of an L-bracket can be inserted between the flashing sub-assembly and mounting surface.

Figure 6:
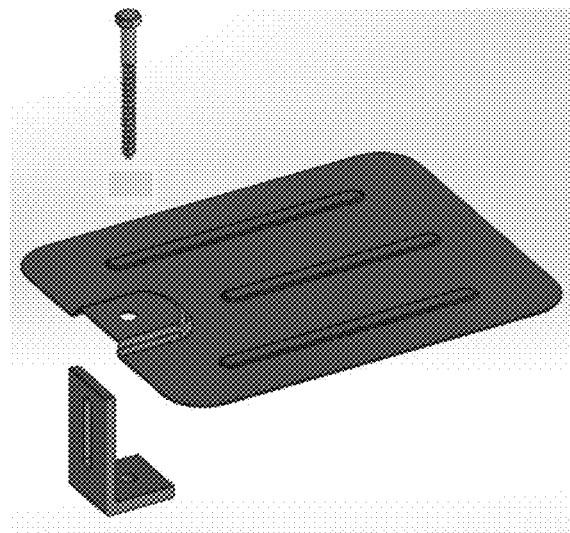
FIG. 6 shows an exploded view of an implementation of the invention.

FIG. 6 shows an exploded view of the L-bracket and flashing assembly again showing how a portion of the L-bracket can be inserted in the raised portion of the flashing. Once the apertures are aligned, a lag bolt is then inserted through the flashing's raised portion aperture, then the L-bracket aperture, and into the mounting surface (e.g. exterior roof surface).

Figure 7:
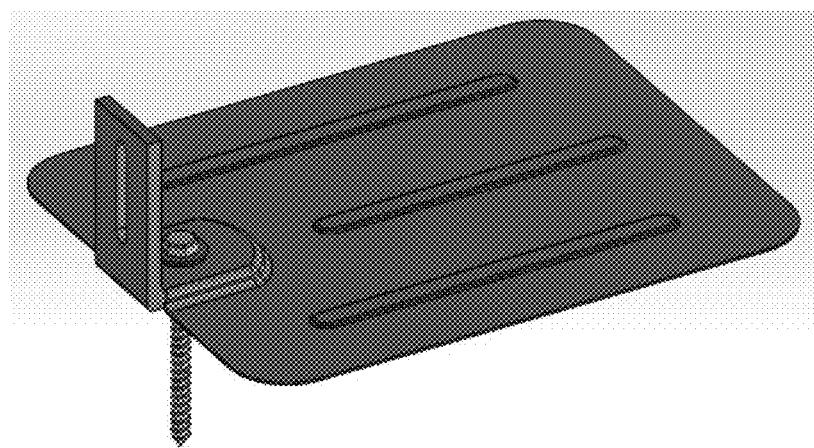
FIG. 7 shows a view of the invention assemblies after installation.

FIG. 7 shows the embodiment of FIG. 6 when the lag bolt has been inserted through flashing and L-bracket and tightened. Note the absence of a rubberized sub-assembly such as that shown for prior art.

The invention herein disclosed represents an improvement over prior art in that it involves fewer components (e.g. no rubberized sub-assembly) and has superior leak resistance due to the upraised portion of the flashing which slopes away from the lag bolt. Because the lag bolt does not have to first be inserted through a rubberized sub-assembly, installation should be both simpler and faster.

The flashing and L-bracket assembly would be made of metallic material with sufficient rigidity and strength to support anticipated load. The dimensions of flashing and L-bracket are not critical. The portion of the L-bracket that is essentially perpendicular to the roof surface should be long enough to position the rack above the roof surface consistent with best practices. Dimensions of the upraised portion of the flashing sub-assembly should slightly exceed the dimensions of the L-bracket with which it will be employed.

What is claimed is:

1. A system comprising:
   a metallic L-bracket sub-assembly wherein a first portion of said metallic L-bracket sub-assembly is to be aligned parallel to a mounting surface and a second portion of said metallic L-bracket sub-assembly is perpendicular to said first portion;
   said first portion and said second portion of said metallic L-bracket sub-assembly have at least one aperture;
   a first aperture of said first portion of said metallic L-bracket sub-assembly is operative to allow a lag bolt to be inserted through it;
   a second aperture of said second portion of said metallic L-bracket sub-assembly is operative to allow a roof-rack-mounting fixture to be affixed to it;
   a metallic flashing sub-assembly that is essentially a flat, rectangular sheet;
   said metallic flashing sub-assembly has an upraised portion with length, width and thickness dimensions larger than those of said first portion of said metallic L-bracket sub-assembly such that said first portion of said metallic L-bracket sub-assembly will fit snuggly within said upraised portion;
   said upraised portion of said metallic flashing sub-assembly is sloped in all directions away from said first aperture so as to encourage the flow of water impinging said raised surface to flow away from said first aperture;
   said metallic flashing sub-assembly has a third aperture of size essentially equal to said first aperture of said first portion of said metallic L-bracket sub-assembly; and
   a position of said third aperture coincides with a position of said first aperture such that when said first portion of said metallic L-bracket sub-assembly is inserted fully into said upraised portion of said flashing, said first and third apertures are essentially aligned.

2. The system as in claim 1 further comprising:
   said third aperture is grooved around its periphery such that an O-ring may be inserted and fit snugly in said groove such that said O-ring presses against an external lag-bolt shaft when said lag bolt is inserted in said third aperture.

* * * * *